United States Patent
Yokoyama et al.

[11] Patent Number: 5,959,039
[45] Date of Patent: Sep. 28, 1999

[54] RUBBER COMPOSITION HAVING BOTH HIGH AND LOW MOLECULAR WEIGHT POLYMER COMPONENTS, FOR USE IN TIRES

[75] Inventors: Hideaki Yokoyama; Toshiyuki Ishikuro; Tadashi Shibata, all of Tokyo, Japan

[73] Assignee: Bridgestone Corporation, Tokyo, Japan

[21] Appl. No.: 08/671,646

[22] Filed: Jun. 28, 1996

[30] Foreign Application Priority Data

Jun. 30, 1995 [JP] Japan ................................. 7-165960
Jun. 25, 1996 [JP] Japan ................................. 8-164877

[51] Int. Cl.⁶ ................................. C08L 9/02; C08L 9/06
[52] U.S. Cl. ........................ 525/236; 525/237; 525/241
[58] Field of Search .......................... 525/236, 237, 525/241; 152/209 R

[56] References Cited

U.S. PATENT DOCUMENTS

| | | | |
|---|---|---|---|
| 4,261,403 | 4/1981 | Imai et al. | 525/236 |
| 4,304,885 | 12/1981 | Omari et al. | |
| 4,387,757 | 6/1983 | Ogawa et al. | 152/209 R |
| 4,537,936 | 8/1985 | Takao et al. | 525/236 |
| 4,647,614 | 3/1987 | Takao et al. | 525/236 |
| 4,812,525 | 3/1989 | Oshima et al. | 525/232 |
| 5,430,086 | 7/1995 | Saito et al. | 152/209 R |
| 5,508,336 | 4/1996 | Takeichi et al. | |
| 5,534,592 | 7/1996 | Halasa et al. | 525/236 |
| 5,580,930 | 12/1996 | Kang et al. | 525/236 |

FOREIGN PATENT DOCUMENTS

| | | |
|---|---|---|
| 0087736A1 | 9/1983 | European Pat. Off. . |
| 0585012A1 | 3/1994 | European Pat. Off. . |
| A20751181 | 1/1997 | European Pat. Off. . |
| 574614 | 10/1983 | Japan . |
| 62-179542 | 6/1987 | Japan . |
| 62-179548 | 8/1987 | Japan . |
| 63-101440 | 5/1988 | Japan . |
| 4100810 | 4/1992 | Japan . |
| 07053784 | 2/1995 | Japan . |
| 08073657 | 3/1996 | Japan . |
| 08188673 | 7/1996 | Japan . |
| 2172002 | 9/1986 | United Kingdom . |

*Primary Examiner*—Donald R. Wilson
*Attorney, Agent, or Firm*—Sughrue, Mion, Zinn Macpeak & Seas, PLLC

[57] ABSTRACT

A tire having a portion formed of a rubber composition which comprises a high-molecular-weight polymer component which contains bound styrene in an amount not greater than 30% by weight, is a styrene-butadiene copolymer or a conjugated diene polymer such as polybutadiene, and has a weight-average molecular weight of at least $30\times10^4$; and a low-molecular-weight polymer component which contains bound styrene in an amount not greater than 30% by weight, is a styrene-butadiene copolymer or a conjugated diene polymer such as polybutadiene, and has a weight-average molecular weight of from $0.2\times10^4$ to $8\times10^4$. The rubber composition contains 30 parts by weight of the low-molecular-weight polymer component relative to 100 parts by weight of the high-molecular-weight polymer component. The ratio between the amount of bound styrene and the vinyl linkage content falls within specific ranges. When the vulcanized rubber composition was extracted by chloroform, an amount of the extract is not less than 15% by weight of the low-molecular-weight polymer component.

8 Claims, No Drawings

RUBBER COMPOSITION HAVING BOTH HIGH AND LOW MOLECULAR WEIGHT POLYMER COMPONENTS, FOR USE IN TIRES

BACKGROUND OF THE INVENTION

1. Field of the Invention

This invention relates to a rubber composition which is suitable for use in various rubber products including tires and industrial goods. More specifically, this invention relates to a rubber composition which is suitable for use in a tire tread having excellent flexibility at lower temperature and excellent gripping power.

This invention also relates to a tire in which the above-mentioned rubber composition is used.

2. Description of Related Art

In recent years, automobiles have been required to have low mileage and high safety. Accordingly, there is a demand for the improvement on gripping properties of a rubber composition which is used for the tread portion of a tire, both under wet conditions and dry conditions.

It is known that a butadiene rubber and a styrene-butadiene copolymer rubber of low bound styrene and low vinyl linkage proportions, which have conventionally been used widely for the tread portion of a tire, are excellent in low-temperature flexibility because of their low glass transition points (Tg) compared with other synthetic rubbers. They are therefore employed widely for the tread of a studless tire or an all-season tire.

A tread for which the butadiene rubber or the styrene-butadiene copolymer rubber having low bound styrene and low vinyl linkage proportions has been used is however accompanied with a problem that sufficient gripping properties cannot be obtained easily because of the low tan δ of the resulting rubber composition.

It is a common practice to lower the glass transition point (Tg) of a polymer so as to attain the low-temperature flexibility of a rubber composition. On the other hand, for an improvement of a gripping performance, it is necessary to raise Tg, thereby increasing tan δ. It is therefore difficult to satisfy these two performances at the same time.

Furthermore, a butadiene rubber or a styrene-butadiene copolymer rubber having low bound styrene and low vinyl linkage proportions are also accompanied with drawbacks that increase in its blending amount results in drop in processability such as roll winding property, and increase in shrinkage, thereby deteriorating the dimensional accuracy of the finished product.

SUMMARY OF THE INVENTION

An object of the present invention is to provide a rubber composition which has an excellent low-temperature flexibility, good gripping properties not only on a surface with usual conditions but also on a surface covered with ice or snow, a good processability including a roll winding property and an improved shrinkage property.

Another object of the present invention is to provide a tire wherein such a rubber composition is used.

To attain the above-mentioned objects, the present inventors have conducted an extensive research, leading to the completion of the present invention relating to a rubber composition having excellent low-temperature flexibility, gripping properties and processability.

In one aspect of the present invention, there is thus provided a rubber composition comprising:

- a high-molecular-weight polymer component which is selected from the group consisting of a conjugated diene polymer, and a copolymer of a vinyl aromatic hydrocarbon and a conjugated diene, which has a weight-average molecular weight of at least $30 \times 10^4$ in terms of polystyrene, and which contains bound styrene in an amount not greater than 30% by weight; and
- a low-molecular-weight polymer component which is selected from the group consisting of a conjugated diene polymer and a copolymer of a vinyl aromatic hydrocarbon and a conjugated diene, which has a weight-average molecular weight of from $0.2 \times 10^4$ to $8 \times 10^4$ in terms of polystyrene, and which contains bound styrene in an amount not greater than 30% by weight, wherein each of said high-molecular-weight polymer component and said low-molecular-weight polymer component satisfies the following formula:

$$S+(V/2)<25$$

wherein S represents an amount (% by weight) of bound styrene and V represents a vinyl linkage content (% by weight), said rubber composition contains from 30 to 120 parts by weight of said low-molecular-weight polymer component relative to 100 parts by weight of said high-molecular-weight polymer component, and at least 15% by weight of the low-molecular weight polymer component is extractable by chloroform from the vulcanized rubber composition.

In the other aspect of the present invention, there is also provided a tire having a portion formed of a rubber composition comprising:

- a high-molecular-weight polymer component which is selected from the group consisting of a conjugated diene polymer, and a copolymer of a vinyl aromatic hydrocarbon and a conjugated diene, which has a weight-average molecular weight of at least $30 \times 10^4$ in terms of polystyrene, and which contains bound styrene in an amount not greater than 30% by weight; and
- a low-molecular-weight polymer component which is selected from the group consisting of a conjugated diene polymer, and a copolymer of a vinyl aromatic hydrocarbon and a conjugated diene, which has a weight-average molecular weight of from $0.2 \times 10^4$ to $8 \times 10^4$ in terms of polystyrene, and which contains bound styrene in an amount not greater than 30% by weight, wherein each of said high-molecular-weight polymer component and said low-molecular-weight polymer component satisfies the following formula:

$$S+(V/2)<25$$

wherein S represents an amount (% by weight) of bound styrene and V represents a vinyl linkage content (% by weight), said rubber composition contains from 30 to 120 parts by weight of said low-molecular-weight polymer component relative to 100 parts by weight of said high-molecular-weight polymer component, and at least 15% by weight of the low-molecular weight polymer component is extractable by chloroform from the vulcanized rubber composition.

The rubber composition according to the present invention has excellent low-temperature flexibility, good gripping properties not only on a surface with usual conditions but also on a surface covered with ice or snow, a good processability such as a roll winding property, and has an improved shrinkage property.

DETAILED DESCRIPTION OF THE PREFERRED EMBODIMENTS

The present invention will hereinafter be described in detail.

The rubber composition according to the present invention comprises, as raw materials for rubber component, a high-molecular-weight polymer component which is selected from the group consisting of a conjugated diene polymer and a copolymer of a vinyl aromatic hydrocarbon and a conjugated diene, which has a weight-average molecular weight of not less than $30 \times 10^4$ in terms of polystyrene, and which contains bound styrene in an amount not greater than 30% by weight; and a low-molecular-weight polymer component which is selected from the group consisting of a conjugated diene polymer and a copolymer of a vinyl aromatic hydrocarbon and a conjugated diene, which has a weight-average molecular weight of from $0.2 \times 10^4$ to $8 \times 10^4$ in terms of polystyrene, and which contains bound styrene in an amount not greater than 30% by weight. When the weight-average molecular weight of the high-molecular-weight polymer component (hereinafter referred to as "high-molecular-weight component") is less than $30 \times 10^4$, the Mooney viscosity of the rubber composition lowers upon blending with the low-molecular-weight polymer component (hereinafter referred to as "low-molecular-weight component"), leading to deteriorations in breaking resistance and wear resistance. Furthermore, the lowering in viscosity causes a marked deterioration in the processability. The preferred weight-average molecular weight of the high-molecular-weight component falls within a range of from $50 \times 10^4$ to $150 \times 10^4$.

On the other hand, when the weight-average molecular weight of the low-molecular-weight component is less than $0.2 \times 10^4$, no improvement in gripping properties can be observed. When the weight-average molecular weight exceeds $8 \times 10^4$, gripping properties are not improved and the processability becomes worse. Preferably, the weight-average molecular weight of the low-molecular-weight component falls within a range of $0.5 \times 10^4$ to $4 \times 10^4$ from the viewpoint of the improvement in the gripping property within a wide temperature range from low temperature to high temperature.

Less than 30 parts by weight of the low-molecular-weight component relative to 100 parts by weight of the high-molecular-weight component is not preferred because sufficient improvement on gripping properties cannot be observed. Also, more than 120 parts by weight of the low-molecular-weight component relative to 100 parts by weight of the high-molecular-weight component is not preferred because the Mooney viscosity of the rubber composition decreases so as to lead to deteriorations in breaking resistance and wear resistance, and a considerable deterioration in the processability thereof is caused owing to decrease in viscosity.

When an attention is paid to micro-structures of the high-molecular-weight component and the low-molecular-weight component to be blended, if the amount of the bound styrene contained in any of them exceeds 30% by weight, entanglement of the molecules of the low-molecular-weight component does not occur easily whereby improvement on the gripping property becomes insufficient. Also, the low-temperature flexibility decreases. When an amount (% by weight) of bound styrene is represented by S and a vinyl linkage content (% by weight) is represented by V, it is necessary for both components to satisfy the following formula:

$$S+(V/2)<25$$

This expression represents an index correlative to Tg (glass transition point), in which consideration is taken into respective effect or contribution of the amounts S and V onto Tg. Preferably, $S+(V/2)<20$.

25 or more of the value of $S+(V/2)$ should be avoided because deterioration in the low-temperature flexibility occurs.

It is necessary that the amount of an extract obtained by extracting a vulcanized rubber composition containing the above-mentioned polymer mixture of the present invention which satisfies the above-mentioned conditions, by chloroform is not less than 15% by weight relative to the blending amount of the low-molecular-weight component. Larger value of the amount of this extract tends to exhibit good effects. Preferably, the amount is from 30 to 98% by weight. When the amount of the extract by chloroform is less than 15% by weight, sufficient improvement in the gripping property cannot be obtained.

The above-described polymer contained in the rubber composition according to the present invention comprises a low-molecular-weight component and a high-molecular-weight component each selected from the group consisting of a conjugated diene polymer, and a copolymer of a vinyl aromatic hydrocarbon and a conjugated diene.

The conjugated diene polymer may be obtained by polymerizing as a monomer a conjugated diene hydrocarbon containing 4–12 carbon atoms, preferably 4–8 carbon atoms per molecule. Examples of the conjugated diene hydrocarbon monomer usable in the present invention include 1,3-butadiene, isoprene, 2,3-dimethyl-1,3-butadiene, 1,3-pentadiene and octadiene, with 1,3-butadiene being particularly preferred. They can be used either singly or in combination. As a conjugated diene polymer, polybutadiene is preferred in the light of industrial productivity.

The above-described copolymer of a vinyl aromatic hydrocarbon and a conjugated diene is obtained by copolymerizing the above conjugated diene hydrocarbon monomer and a vinyl aromatic hydrocarbon monomer. Examples of the vinyl aromatic hydrocarbon monomer usable in the present invention include styrene, α-methylstyrene, p-methylstyrene, o-methylstyrene, p-butylstyrene and vinyl naphthalene, with styrene being particularly preferred. They can be used either singly or in combination. As the copolymer of a vinyl aromatic hydrocarbon and a conjugated diene, a styrene-butadiene copolymer is preferred in the light of industrial productivity.

There is no particular limitation imposed on the preparation process of the above-described polymer components employed in the invention. Any polymerization process can be employed insofar as a product prepared by the process satisfies each of the above conditions. From the industrial viewpoint, anionic solution polymerization using a lithium polymerization initiator, coordination polymerization or emulsion polymerization using dodecyl mercaptan or the like can be conventionally employed.

When synthesis is conducted by an anionic solution polymerization using a lithium polymerization initiator, preferred examples of a lithium compound for the initiator include alkyl lithiums such as ethyl lithium, propyl lithium, n-butyl lithium, sec-butyl lithium, tert-butyl lithium and hexyl lithium; alkylene dilithiums such as 1,4-dilithiobutane; other hydrocarbon lithiums such as reaction products of divinyl benzene with phenyl lithium, stilbene dilithium or butyl lithium; organometallic lithiums such as tributyltin lithium; and lithium amides such as lithium diethyl amide, lithium diisopropyl amide and lithium piperidide. Preferred is n-butyl lithium or sec-butyl lithium. These lithium compounds can be used either singly or in combination. These lithium compounds can be used within a range of 0.2 to 30 mmoles per 100 g of the monomer. The molecular weight of the polymer can be adjusted easily by controlling, for example, the concentration of the lithium compound. At the time of the anionic solution polymerization, a randomizer may be used. Examples of a randomizer which is well-known and is generally used include ethers such as THF (tetrahydrofuran); tertiary amines; hydrides of an alkali metal or an alkaline earth metal; alcohol salts of an alkali metal or an alkaline earth metal, such as potassium t-amylate; and carboxylates, sulfonates, and amine salts of an alkali metal or an alkaline earth metal. These randomizers can be used either singly or in combination if needed. As the randomizer, THF and potassium t-amylate are preferred. As a polymer synthesized by a solution polymerization, a styrene-butadiene copolymer is preferred.

Examples of the polymer obtained by the coordination polymerization include high cis-1,4-polybutadiene, which can be obtained by using a coordination catalyst of nickel, cobalt or neodymium, such as $TiCl_4I_2$—$AlR_3$ (wherein R represents an alkyl group, and will have the same meaning below), an organic cobalt carboxylate, such as —$AlR_2Cl$—$H_2O$ or an organic nickel carboxylate, such as —$BF_3.(C_2H_5)O$—$AlR_3$; and a high trans-1,4-polybutadiene rubber and a high-trans-styrene-butadiene rubber, which can be obtained by using magnesium, lithium or barium as a catalyst.

It is preferred that the above-described conjugated diene polymer, and the copolymer of a vinyl aromatic hydrocarbon and a conjugated diene are a butadiene rubber and a butadiene-styrene copolymer rubber, respectively. From the viewpoint of a balance between the low-temperature properties and gripping properties, it is preferred that each of the high-molecular-weight component and the low-molecular-weight component is a butadiene rubber.

At the time when the polymer contained in the raw material for a rubber composition is obtained by blending the low-molecular-weight component and the high-molecular-weight component, these low-molecular-weight component and high-molecular-weight component may be subjected to dry blending. However, preferably they are blended in the form of cements after polymerization, since such blending can prevent the occurrence of a cold flow of the low-molecular-weight component.

In the raw material for the rubber composition according to the present invention, a natural rubber and/or a synthetic rubber may be blended with the above-described polymer. Upon blending, it is necessary to incorporate, into 100 parts by weight of the raw material for the rubber composition, the above-described polymer in an amount not less than 20 parts by weight, preferably not less than 30 parts by weight. For example, when the amount of the above-described polymer is less than 20 parts by weight upon blending with a natural rubber, improvements in low-temperature flexibility and a gripping property are insufficient.

Examples of the synthetic rubber which can be blended include cis-1,4-polyisoprene, low cis-1,4-polybutadiene, high cis-1,4-polybutadiene, ethylene-propylene-diene copolymers, chloroprene, halogenated butyl rubbers and acrylonitrile-butadiene rubber (NBR).

In the present invention, additives which are conventionally used in the rubber industry can be incorporated in addition to the above-described raw materials for the rubber composition. Examples of the additives include vulcanizing agents, such as sulfur; vulcanizing accelerators, such as DM (dibenzothiazyl disulfide) and DPG (diphenyl guanidine); antioxidants, such as BHT (2,6-di-t-butyl-p-cresol); fillers, such as carbon black and white fillers; zinc oxide; stearic acid; oxidation inhibitors; and ozone oxidation inhibitors.

Specific examples of carbon black include HAF, ISAF and SAF. Preferable carbon black has iodine absorption (IA) of 60 mg/g or greater and dibutyl phthalate oil absorption (DBP) of 80 ml/100 g or greater. Specific examples of the white filler include silica (hydrous silica), silicic anhydride, calcium silicate, aluminum silicate, clay, talc, calcium carbonate, basic magnesium carbonate, alumina hydrate, diatomaceous earth, barium sulfate, mica, alumina sulfate and titanium oxide. Among them, silica is preferred. These filler can be used in combination. The use of them in combination can highly improve various properties.

The rubber composition according to the present invention can be obtained by kneading a polymer blend and other additives together in a kneader, such as a roll mixer and an internal mixer. After forming and processing the composition, it is vulcanized. The vulcanized rubber composition can be used for various applications, such as tire-related applications, for example, a tire tread, an under tread, a carcass, a side wall and a bead portion, and other industrial applications, for example, a rubber vibration insulator, a belt and a hose. It is particularly suited for use as a tire tread.

EXAMPLES

The present invention will hereinafter be described in more detail by the following examples. However, the present invention is not limited only to the following examples so long as they do not depart from the spirit or scope of the invention. All designations of "part" or "parts" and "%" mean part or parts by weight and % by weight, respectively, unless otherwise specifically indicated.

Various measurements were conducted in accordance with the following methods:

The weight-average molecular weight and molecular weight distribution of a polymer were measured by gel permeation chromatography (GPC), using a differential refractive index (RI) and, as a solvent, tetrahydrofuran (THF). These molecular weights were ones in terms of polystryene, i.e., they were obtained by conversion into polystyrene molecular weight, using monodisperse polystyrene as a standard.

The micro structure of the butadiene moiety of a styrene-butadiene copolymer was determined by the infrared ray method (D. Morero et. al., Chem. Ind., 41, 758 (1959)). The amount of bound styrene was determined from a calibration curve obtained by the infrared ray method based on the absorption of a phenyl group at 699 $cm^{-1}$.

The amount of the extract obtainable by means of extraction by chloroform was determined from the amount of the vulcanized rubber which remained after the extraction of a vulcanized rubber sample for 48 hours by a Soxhlet extractor using chloroform as a solvent.

As an index of hysteresis loss and gripping property of the vulcanized rubber composition, tan δ at 0° C. was employed. The vulcanized rubber composition was evaluated to have higher hysteresis loss value and better gripping property when the tan δ at 0° C. was higher. As an index of low-temperature flexibility, storage elastic modulus at −20°

C. was used. Tan δ at 0° C. and storage elastic modulus at −20° C. were measured using a viscoelasticity measuring apparatus (manufactured by Rheometrix Incorporation) at a strain of 0.1% and a frequency of 10 MHz. The tan δ and storage elastic modulus at −20° C. were measured at 0° C. and −20° C., respectively.

Tensile strength was measured in accordance with JIS K 6301.

A shrinkage property was measured by "RHEOGRAPH 2000" (trade name; product of GOTTFERT INCORP.). Using a die which was in the form of a equilateral triangle of 8 mm in base and 2 mm in height and was of 2 mm thickness, the unvulcanized rubber composition was extruded at 100° C. and 10 mm/sec. From the ratio of the length of the composition just after the extrusion and the length of the composition after being allowed to stand for 24 hours, the shrinkage ratio was calculated.

The shrinkage properties on the level not causing a practical problem were ranked as good (◯), those on a little worse level than (◯) were ranked as (Δ) and those on the level causing a practical problem were ranked as inferior, i.e., the worst level (X).

The processability was evaluated by observing the processability upon preparing a vulcanized rubber composition in the examples which will be described later. The good processability was ranked as ◯, a little worse processability than (◯) was ranked as Δ. The worst processability was ranked as X.

SYNTHESIS EXAMPLE 1

A 5-liter reactor which had been dried and purged with nitrogen was sufficiently washed with dried and deaerated cyclohexane and an n-butyl lithium solution, and then 2,910 g of a 15.5% solution of 1,3-butadiene in hexane were poured into the reactor by a nitrogen pressure. While stirring, the temperature in the reactor was adjusted to 50° C., followed by the addition of 0.96 ml of a 1.6N n-butyl lithium solution so as to conduct polymerization. After the completion of the polymerization, about 30 ml of isopropyl alcohol containing 1 part by weight of 2,6-di-t-butyl-p-cresol (BHT) as an antioxidant was added and the polymerization was terminated completely. The polymer so obtained was found to have a weight-average molecular weight of $85 \times 10^4$ and a vinyl linkage content of 10%. The polymer so obtained was used as a high-molecular-weight polymer component.

In the same manner as the above polymerization process except that the amount of the 1.6N n-butyl lithium solution was changed from 0.96 ml to 25 ml, a polymer was obtained. The polymer so obtained had a weight-average molecular weight of $2.0 \times 10^4$ and a vinyl linkage content of 10%. At that time, the value of S+(V/2) was 5. The polymer so obtained was used as a low-molecular-weight polymer component.

The high-molecular-weight polymer component and the low-molecular-weight polymer component were cement-blended at a predetermined blending ratio. The resulting blend was subjected to steam trap, followed by drying at 60° C. in a hot-air drying oven for at least 5 hours, whereby a polymer blend was obtained.

EXAMPLES 1–11 AND COMPARATIVE EXAMPLES 1–8

In each example, a low-molecular-weight component having the molecular weight and micro-structure as shown in Table 1 was obtained by adjusting the blending amount of n-butyl lithium and amounts of styrene and butadiene monomers or controlling the kind and amount of a randomizer, such as THF and tertiary amine.

The respective low-molecular-weight component so obtained was cement-blended and kneaded with the high-molecular-weight component, which had been obtained in Synthesis Example 1 and had a weight-average molecular weight of $85 \times 10^4$ and a vinyl linkage content of 10%, at a predetermined blending ratio described in Table 1, whereby a polymer blend was obtained as a sample.

The polymer blend so obtained was kneaded in a 250-ml plastomill (manufactured by Toyo Seiki Seisaku-sho, Ltd.) in accordance with the blending formulation in Table 2 and then, the resulting composition was vulcanized at 145° C. for 33 minutes, whereby a vulcanized rubber composition was obtained.

The viscoelasticity and tensile strength of the vulcanized rubber composition thus obtained were measured and in addition, the amount of extract with chloroform was weighed. The results are shown in Table 3.

COMPARATIVE EXAMPLES 9 and 10

In Comparative Examples 9 and 10, evaluated in the same manner as in Example 1 were commercially available rubbers as follows: "BR01" (trade name; product of Japan Synthetic Rubber Co., Ltd.; a vinyl linkage content: 3%) and "SBR#1500" (trade name; product of Japan Synthetic Rubber Co., Ltd.; weight-average molecular weight: $45 \times 10^4$; a bound styrene content of 23.5%, vinyl linkage content: 18%).

COMPARATIVE EXAMPLE 11

With 100 parts by weight of polybutadiene having a weight-average molecular weight of $25 \times 10^4$, a vinyl linkage content of 10% as a high-molecular-weight component, 100 parts by weight of polybutadiene having a weight-average molecular weight of $2.0 \times 10^4$, and a vinyl linkage content of 10% were cement-blended, as a low-molecular-weight component, whereby a polymer blend was obtained.

The polymer blend so obtained was treated in the same manner as in Example 1, whereby a rubber composition was obtained. The resulting rubber composition was evaluated as in Example 1. The results are shown in Table 3.

COMPARATIVE EXAMPLE 12

With 100 parts by weight of a styrene-butadiene copolymer having a weight-average molecular weight of $90 \times 10^4$, a vinyl linkage content of 17%, and a bound styrene content of 23.5%, as a high-molecular-weight component, 100 parts by weight of polybutadiene having a weight-average molecular weight of $2.0 \times 10^4$, and a vinyl linkage content of 10% were cement-blended as a low-molecular-weight component, whereby a polymer blend was obtained.

The polymer blend so obtained was treated in the same manner as in Example 1, whereby a rubber composition was obtained. The resulting rubber composition was evaluated as in Example 1. The results are shown in Table 3.

COMPARATIVE EXAMPLE 13

With 100 parts by weight of polybutadiene having a weight-average molecular weight of $85 \times 10^4$, a vinyl linkage content of 17%, and a vinyl linkage content of 10%, as a high-molecular-weight component, 100 parts by weight of polybutadiene having a weight-average molecular weight of $2.0\times10^4$, and a vinyl content of 10% were cement-blended as a low-molecular-weight component, whereby a polymer blend was obtained.

The polymer blend so obtained was treated in the same manner as in Example 1 except that in the blending formulation in Table 2, the amount of sulfur was changed from 1.5 parts to 2.5 parts and the amount of the vulcanizing accelerator DPG was changed from 0.6 part to 1.0 part, whereby a rubber composition was obtained. Evaluation was conducted as in Example 1. The results are shown in Table 3.

SYNTHESIS EXAMPLE 2

In a 2-liter autoclave which had been dried and purged with nitrogen, a solution of 224 g of 1,3-butadiene dissolved in 576 g of dehydrated benzene was charged. To the resulting solution, 2.2 mmoles of water was added, while stirring for 30 minutes. The temperature of the reaction mixture was adjusted to 50° C., followed by the addition of 2.9 mmoles of diethylaluminum chloride, 0.008 mmole of cobalt octoate and 1.5 mmoles of 1,5-cyclooctadiene while stirring. The resulting mixture was stirred for 30 minutes, whereby polybutadiene was obtained.

The polymerization was terminated by the addition of 5 ml of a 50:50 methanol-benzene mixed solution containing 0.5 g of BHT.

The polymer (polybutadiene) so obtained had a weight-average-molecular weight of $105\times10^4$ and its micro-structure in the butadiene moiety was composed of 96.6% of a cis-form content, 2.1% of a vinyl linkage content and 1.3% of a trans-form content. The polymer was designated as a high-molecular-weight polymer component.

EXAMPLES 12 AND 13, AND COMPARATIVE EXAMPLES 14

In each example, a low-molecular-weight component having the molecular weight and micro-structure as shown in Table 4 was obtained by adjusting the blending amount of n-butyl lithium and amounts of styrene and butadiene monomers or controlling the kind and amount of the randomizer such as THF or tertiary amine. The low-molecular-weight component so obtained was cement-blended with the high-molecular-weight component, which had been obtained in Synthesis Example 2 and had a weight-average molecular weight of $105\times10^4$, at a predetermined blending ratio shown in Table 4.

The resulting polymer was subjected to steam trap, followed by drying at 60° C. in a hot-air drying oven for at least 5 hours, whereby a polymer blend was obtained as a sample.

The respective polymer blend so obtained was kneaded in a 250-ml plastomill (manufactured by Toyo Seiki Seisakusho, Ltd.) in accordance with the blending formulation in Table 2. The resulting composition was vulcanized at 145° C. for 33 minutes, whereby a vulcanized rubber composition was obtained.

The viscoelasticity and tensile strength of the vulcanized rubber composition so obtained were measured and in addition, the amount of extract by chloroform were weighed. The results are shown in Table 5.

COMPARATIVE EXAMPLE 15

In the same manner as in Synthesis Example 2 except that the amount of 1,5-cyclooctadiene was increased to 120 mmoles, a polymer was obtained. The polymer so obtained had a weight-average molecular weight of $8.5\times10^4$ and its micro-structure at the butadiene moiety was composed of 96.6% of a cis-form content, 2.1% of a vinyl linkage content and 1.3% of a trans-form content. It was designated as a low-molecular-weight polymer component.

The low-molecular-weight component so obtained was cement-blended with the high-molecular-weight component which had been obtained in Synthesis Example 2, at a predetermined blending ratio described in Table 4, to obtain a vulcanized rubber composition, in the same manner as in Example 12.

In the same manner as in Example 1, viscoelasticity, tensile strength and storage elastic modulus at $-20°$ C. of the vulcanized rubber composition so obtained were measured, and an amount of the extract by chloroform were weighed. The results are shown in Table 5.

TABLE 1

| Sample | Amount of a low-molecular-weight component added* (parts by weight) | Molecular weight (Mw) | Styrene content (%) | Vinyl content (%) | S + (V/2) |
|---|---|---|---|---|---|
| C1 | 100 | $1 \times 10^3$ | 0 | 10 | 5 |
| E1 | 100 | $2 \times 10^3$ | 0 | 10 | 5 |
| E2 | 100 | $5 \times 10^3$ | 0 | 10 | 5 |
| E3 | 100 | $10 \times 10^3$ | 0 | 10 | 5 |
| E4 | 100 | $20 \times 10^3$ | 0 | 10 | 5 |
| E5 | 100 | $40 \times 10^3$ | 0 | 10 | 5 |
| E6 | 100 | $60 \times 10^3$ | 0 | 10 | 5 |
| C2 | 100 | $90 \times 10^3$ | 0 | 10 | 5 |
| C3 | 20 | $20 \times 10^3$ | 0 | 10 | 5 |
| E7 | 40 | $20 \times 10^3$ | 0 | 10 | 5 |
| E8 | 60 | $20 \times 10^3$ | 0 | 10 | 5 |
| C4 | 150 | $20 \times 10^3$ | 0 | 10 | 5 |
| E9 | 100 | $20 \times 10^3$ | 0 | 20 | 10 |
| E10 | 100 | $20 \times 10^3$ | 10 | 20 | 20 |
| C5 | 100 | $20 \times 10^3$ | 20 | 20 | 30 |
| C6 | 100 | $20 \times 10^3$ | 25 | 20 | 35 |
| E11 | 100 | $20 \times 10^3$ | 0 | 40 | 20 |
| C7 | 100 | $20 \times 10^3$ | 10 | 40 | 30 |
| C8 | 100 | $20 \times 10^3$ | 0 | 60 | 30 |
| C9 | 0 | — | — | — | — |
| C10 | 0 | — | — | — | — |
| C11 | 100 | $20 \times 10^3$ | 0 | 10 | 5 |
| C12 | 100 | $20 \times 10^3$ | 0 | 10 | 5 |
| C13 | 100 | $20 \times 10^3$ | 0 | 10 | 5 |

E: Example within the scope of the present invention
C: Comparative example out of the scope of the present invention
(The symbols indicate the same meaning in all tables.)
Styrene content = Bound styrene content
Vinyl content = Vinyl linkage content
(These indicate the same in all tables.)
*Amount relative to 100 parts by weight of a high-molecular-weight component

TABLE 2

| Blending formulation of a rubber composition | |
|---|---|
| A polymer blend | 100 parts by weight |
| Carbon black (HAF) | 50 parts by weight |
| Stearic acid | 2 parts by weight |
| Antioxidant 6C*[1] | 1 part by weight |
| Zinc oxide | 3 parts by weight |
| Vulcanizing accelerator DPG*[2] | 0.6 part by weight |
| Vulcanizing accelerator DM*[3] | 1.2 parts by weight |
| Sulfur | 1.5 parts by weight |

*[1]N-(1,3-Dimethylbutyl)-N'-phenyl-p-phenylenediamine
*[2]Diphenylguanidine
*[3]Dibenzothiazyl disulfide

TABLE 3

| Sample | -20° C. Storage elastic modulus | tanδ | Extract with chloroform (%) | Tensile Strength (Tb) (Kg/cm²) | Shrinkage ratio | Processability |
|---|---|---|---|---|---|---|
| C1 | $4.00 \times 10^7$ | 0.16 | 98 | 165 | Δ | Δ |
| E1 | $4.10 \times 10^7$ | 0.19 | 96 | 180 | ○ | ○ |
| E2 | $4.20 \times 10^7$ | 0.21 | 90 | 185 | ○ | ○ |
| E3 | $4.40 \times 10^7$ | 0.23 | 65 | 186 | ○ | ○ |
| E4 | $4.60 \times 10^7$ | 0.28 | 35 | 188 | ○ | ○ |
| E5 | $5.40 \times 10^7$ | 0.24 | 25 | 187 | ○ | ○ |
| E6 | $5.80 \times 10^7$ | 0.19 | 17 | 190 | ○ | ○ |
| C2 | $6.20 \times 10^7$ | 0.15 | 3 | 190 | Δ | Δ |
| C3 | $5.70 \times 10^7$ | 0.17 | 40 | 210 | Δ | Δ |
| E7 | $5.10 \times 10^7$ | 0.19 | 37 | 195 | ○ | ○ |
| E8 | $4.80 \times 10^7$ | 0.22 | 38 | 190 | ○ | ○ |
| C4 | $4.20 \times 10^7$ | 0.32 | 43 | 172 | x | x |
| E9 | $4.60 \times 10^7$ | 0.27 | 40 | 186 | ○ | ○ |
| E10 | $1.00 \times 10^8$ | 0.22 | 41 | 187 | ○ | ○ |
| C5 | $1.40 \times 10^8$ | 0.22 | 33 | 190 | ○ | ○ |
| C6 | $2.80 \times 10^8$ | 0.20 | 32 | 189 | ○ | ○ |
| E11 | $1.50 \times 10^8$ | 0.24 | 36 | 181 | ○ | ○ |
| C7 | $2.15 \times 10^8$ | 0.23 | 34 | 183 | ○ | ○ |
| C8 | $2.00 \times 10^8$ | 0.22 | 35 | 184 | ○ | ○ |
| C9 | $6.00 \times 10^7$ | 0.16 | 4 | 195 | x | x |
| C10 | $1.70 \times 10^8$ | 0.20 | 8 | 235 | ○ | ○ |
| C11 | $3.00 \times 10^7$ | 0.29 | 52 | 105 | x | x |
| C12 | $1.70 \times 10^8$ | 0.23 | 37 | 205 | ○ | ○ |
| C13 | $5.00 \times 10^7$ | 0.17 | 10 | 180 | ○ | ○ |

TABLE 4

| Sample | Amount of a low-molecular weight component added* (parts by weight) | Molecular weight (Mw) | Styrene content (%) | Vinyl content (%) | Cis-form content (%) | Transform content (%) | S + (V/2) |
|---|---|---|---|---|---|---|---|
| E12 | 40 | $25 \times 10^3$ | 0 | 10.0 | 37.0 | 53.0 | 5.0 |
| E13 | 70 | $25 \times 10^3$ | 0 | 10.0 | 37.0 | 53.0 | 5.0 |
| C14 | 20 | $25 \times 10^3$ | 0 | 10.0 | 37.0 | 53.0 | 5.0 |
| C15 | 40 | $85 \times 10^3$ | 0 | 2.1 | 96.6 | 1.3 | 1.1 |

*Amount relative to 100 parts by weight of a high-molecular-weight component

TABLE 5

| Sample | -20° C. Storage elastic modulus | tanδ | Extract with chloroform (%) | Tensile Strength (Tb) (Kg/cm²) | Shrinkage ratio | Processability |
|---|---|---|---|---|---|---|
| E12 | $9.90 \times 10^7$ | 0.23 | 41 | 196 | ○ | ○ |
| E13 | $4.20 \times 10^7$ | 0.25 | 45 | 193 | ○ | ○ |
| C14 | $4.00 \times 10^7$ | 0.17 | 38 | 199 | Δ | Δ |
| C15 | $4.00 \times 10^7$ | 0.14 | 5 | 200 | Δ | Δ |

As shown in Tables 3 and 5, it was found that the rubber compositions obtained in the above examples of the present invention had, when vulcanized, excellent tensile strength, a high hysteresis loss property and excellent low-temperature flexibility. It was also found that such advantageous effects could be observed when the rubber composition contained 30–120 parts by weight of a low-molecular-weight component having a weight-average molecular weight of $0.2 \times 10^4$ to $8 \times 10^4$ relative to 100 parts by weight of a high-molecular weight component having a weight-average molecular weight of $30 \times 10^4$ or higher, and each rubber component had a specific micro-structure (Examples 1–11). On the other hand, when the molecular weight or the added amount of the low-molecular-weight component was outside the range of the present invention, high grip properties could not be observed (Comparative Examples 1–4). When the values of S+(V/2) of the low-molecular-weight component and/or the high-molecular-weight component were out of the range defined in the invention, low-temperature flexibility was extremely damaged. Thus, advantageous effects of the present invention were not be observed at all (Comparative Examples 5–8 and 12). When the molecular weight of the low-molecular-weight component was small (Comparative Example 11), improvement in low-temperature flexibility was observed but a marked deterioration in the tensile strength occurred thereby resulting in poverty in a shrinkage property and processability. Furthermore, it was found that when the amount of the extract by chloroform was small (Comparative Example 13), no improvement in grip properties was observed even if the amounts of a vulcanizing agent and a vulcanizing accelerator were increased.

It was also found that each of the commercially-available rubber compositions was inferior in either of grip properties or low-temperature flexibility (Comparative Examples 9, 10).

It was found that a similar tendency was observed even when the molecular weight of the high-molecular-weight component was high (Examples 12 and 13). Even in such cases, when the molecular weight of the low-molecular-weight component was high and its amount was small (Comparative Examples 14, 15), high gripping properties were not observed and a shrinkage property and processability were also poor.

What is claimed is:

1. A tire having a portion formed of a rubber composition comprising:

a high-molecular-weight polymer component which is selected from the group consisting of a first polymer of a first conjugated diene, and a first copolymer of a first vinyl aromatic hydrocarbon and a second conjugated diene, which has a weight-average molecular weight by gel permeation chromatography which is calibrated with polystyrene standards of at least $30 \times 10^4$, and which contains bound styrene in an amount less than 25% by weight; and a low-molecular-weight polymer component which is selected from the group consisting of a second polymer of a third conjugated diene, and a second copolymer of a second vinyl aromatic hydrocarbon and a fourth conjugated diene, which has a weight-average molecular weight by gel permeation chromatography which is calibrated with polystyrene standards of from $0.2 \times 10^4$ to $8 \times 10^4$, and which contains bound styrene in an amount less than 25% by weight, wherein each of said high-molecular-weight polymer component and said low-molecular-weight polymer component satisfies the following formula:

$$S+(V/2)<25$$

wherein S represents an amount in % by weight of bound styrene and V represents a vinyl linkage content in % by weight, said rubber composition contains from 30 to 120 parts by weight of said low-molecular-weight polymer component relative to 100 parts by weight of said high-molecular-weight polymer component, and when the rubber composition is vulcanized, an extract of the vulcanized rubber composition, which is extracted with chloroform, is at least 15% by weight of the low-molecular weight relative to the amount polymer component comprised in the rubber composition.

2. A tire according to claim 1, wherein said high-molecular-weight polymer component has a weight-average molecular weight by gel permeation chromatography which is calibrated with polystyrene standards of from $50\times10^4$ to $150\times10^4$.

3. A tire according to claim 1, wherein said low-molecular-weight polymer component has a weight-average molecular weight by gel permeation chromatography which is calibrated with polystyrene standards of from $0.5\times10^4$ to $4\times10^4$.

4. A tire according to claim 1, wherein $S+(V/2)<20$.

5. A tire according to claim 1, wherein each of said first, second, third and fourth conjugated dienes is a conjugated diene hydrocarbon containing 4 to 12 carbon atoms per molecule.

6. A tire according to claim 1, wherein each of said first, second, third and fourth conjugated dienes is selected from the group consisting of 1,3-butadiene, isoprene, 2,3-dimethyl-1,3-butadiene, and 1,3-pentadiene.

7. A tire according to claim 1, wherein each of said first and second vinyl aromatic hydrocarbons is selected from the group consisting of styrene, α-methylstyrene, p-methylstyrene, o-methylstyrene, and p-butylstyrene.

8. A tire according to claim 1, wherein both of said first polymer of a first conjugated diene and second polymer of a third conjugated diene and both of said first and second copolymers of a vinyl aromatic hydrocarbon and a conjugated diene are butadiene rubber and a butadiene-styrene copolymer rubber, respectively.

* * * * *